(12) United States Patent
Lin et al.

(10) Patent No.: US 8,761,685 B2
(45) Date of Patent: Jun. 24, 2014

(54) WIRELESS NETWORK APPARATUS, WIRELESS NETWORK SYSTEM AND WIRELESS NETWORK NODE CONTROLLING METHOD

(75) Inventors: Qiang Lin, Beijing (CN); Jun Tian, Beijing (CN)

(73) Assignee: Fujitsu Limited, Kawasaki (JP)

( * ) Notice: Subject to any disclaimer, the term of this patent is extended or adjusted under 35 U.S.C. 154(b) by 465 days.

(21) Appl. No.: 13/278,337

(22) Filed: Oct. 21, 2011

(65) Prior Publication Data

US 2012/0100811 A1 Apr. 26, 2012

(30) Foreign Application Priority Data

Oct. 21, 2010 (CN) .......................... 2010 1 0526894

(51) Int. Cl.
*H04B 17/00* (2006.01)
*H04L 12/28* (2006.01)

(52) U.S. Cl.
USPC ............... 455/67.11; 455/115.1; 455/424; 370/400; 370/401; 370/408

(58) Field of Classification Search
USPC .......... 455/67.11, 115.1, 423–425, 524, 430, 455/456.1, 456.5; 370/400–408
See application file for complete search history.

(56) References Cited

U.S. PATENT DOCUMENTS

| 7,633,940 | B1* | 12/2009 | Singh et al. ................ 370/389 |
| 2003/0162539 | A1* | 8/2003 | Fiut et al. ..................... 455/424 |
| 2003/0181163 | A1* | 9/2003 | Ofuji et al. ..................... 455/25 |
| 2006/0187866 | A1 | 8/2006 | Werb et al. |
| 2009/0141662 | A1 | 6/2009 | Gurney et al. |
| 2010/0128624 | A1* | 5/2010 | Lee et al. ..................... 370/252 |
| 2010/0290509 | A1* | 11/2010 | Dalsgaard et al. ............. 375/220 |
| 2011/0019601 | A1* | 1/2011 | Li et al. ..................... 370/311 |
| 2011/0053513 | A1* | 3/2011 | Papakostas et al. ........... 455/63.1 |
| 2011/0205949 | A1* | 8/2011 | Maenpaa et al. .............. 370/311 |

FOREIGN PATENT DOCUMENTS

| CN | 101459978 | 6/2009 |
| CN | 101483901 | 7/2009 |
| CN | 101547451 | 9/2009 |
| CN | 101702834 | 5/2010 |

OTHER PUBLICATIONS

Pan Li-Qiang, et al "A Temporal and Spatial Correlation Based Missing Values Imputation Algorithm in Wireless Sensor Networks" Chinese Journal of Computers, vol. 33, No. 1, Jan. 2010.
European Search Report dated Jan. 18, 2012, from corresponding European Application No. 11 18 6027.

* cited by examiner

*Primary Examiner* — Dominic E Rego
(74) *Attorney, Agent, or Firm* — Katten Muchin Rosenman LLP

(57) ABSTRACT

The invention discloses a wireless network apparatus, wireless network system and wireless network node controlling method. The method applied in a wireless network including an aggregation node and a plurality of subnodes includes: randomly setting in advance sleeping time and working time for each subnode according to a predetermined strategy; judging a current state of each subnode, and recording monitor data of the subnode according to the current state of the subnode, wherein: when the subnode is currently in a working state, directly acquiring the monitor data currently reported by the subnode, and recording the acquired monitor data; when the subnode is currently in a sleeping state, estimating current monitor data of the subnode, and recording an estimate value of the monitor data. The embodiment of the invention can facilitate lowered energy consumption of a wireless ad hoc network and improve the robustness, reliability and real-time performance of the network.

20 Claims, 7 Drawing Sheets

WIRELESS NETWORK APPARATUS, WIRELESS NETWORK SYSTEM AND WIRELESS NETWORK NODE CONTROLLING METHOD

FIELD OF THE INVENTION

The present invention generally relates to the field of wireless communications technologies and in particular to a wireless network apparatus, a wireless network system and a wireless network node control method.

BACKGROUND OF THE INVENTION

Wireless communication technologies have been developed rapidly in recent years. Particularly a wireless ad hoc network has been applied in various fields due to its advantages of dispensing with any preset network facility, of rapid automatic networking, etc.

In the wireless ad hoc network, a mode in which a wireless channel is used is specified by the Medium Access Control (MAC) protocol, and a limited resource of wireless communication is allocated between nodes of the wireless network in the MAC protocol. Energy conservation and efficiency is targeted in a research of MAC layer protocols of the wireless ad hoc network due to the significance of network energy consumption to the wireless ad hoc network.

In order to lower the energy consumption of a network node, a period of time for communication of a network node is divided periodically into two portions, i.e., an active portion and an inactive portion, as illustrated in FIG. 1, in an MAC layer protocol of the wireless ad hoc network. The network node is in a working state during the active period of time and does not communicate with any other node in the network during the inactive period of time to thereby enter a sleeping state and consequentially conserve energy.

In the wireless ad hoc network, the same wireless channel is shared among a plurality of network nodes, and the respective nodes transmit random data or instructions. In order to alleviate a collision, a mechanism of accessing the shared channel is created in an MAC layer protocol. At present, a most common MAC layer protocol is the Carrier Sense Multiple Access/Collision Avoidance (CSMA/CA) protocol, and network nodes contest for the wireless channel resource during the active period of time in a mode of CSMA/CA to lower the probability of a collision. Therefore, during the active period of time, a node has to keep in working state all the time even if it has no data to be transmitted, so that it can sense the wireless channel for availability and receive at any moment an instruction transmitted thereto from another node, and both this constant sensing and frequent interaction of instructions may result in unnecessary energy consumption of the node.

SUMMARY OF THE INVENTION

In view of this, embodiments of the invention provide a wireless network apparatus, a wireless network system and a wireless network node control method. According to the solution of embodiments of the invention, random working time and sleeping time can be set for subnodes without taking a limited active period of time/inactive period of time into account, thereby prolonging the sleeping time more flexibly for the subnodes and hence lowering energy consumption of the subnodes. The respective subnodes report monitor data respectively during the set working time without any other interaction of coordination instructions. When a subnode in a sleeping state can not report any monitor data, an aggregation node estimates the monitor data of the subnode according to a preset algorithm to thereby ensure the integrity of the monitor data throughout the network and hence improve the robustness, reliability and real time performance of the system.

An embodiment of the invention further provides a wireless network apparatus applied in a wireless network having a plurality of subnodes which monitor the condition of a specific object and acquire monitor data, the wireless network apparatus includes a scheduling module, a subnode state judging module, a monitor data acquiring module, a monitor data estimating module and a data recording module, wherein:

the scheduling module is configured to randomly set in advance sleeping time and working time for each subnode according to a predetermined strategy and to send the setting result to corresponding subnodes;

the subnode state judging module is configured to judge a current state of each subnode;

the monitor data acquiring module is configured to, in case that the subnode state judging module judges that a subnode is currently in a working state, directly acquire the monitor data currently reported by the subnode, and send to the data recording module the acquired monitor data as the monitor data to be recorded corresponding to the subnode;

the monitor data estimating module is configured to, in case that the subnode state judging module judges that a subnode is currently in a sleeping state, estimate current monitor data of the subnode according to a preset algorithm and to send to the data recording module an estimation value of the monitor data as the monitor data to be recorded corresponding to the subnode; and the data recording module is configured to receive the monitor data to be recorded sent from the monitor data acquiring module or the monitor data estimating module and to perform recording.

According to another aspect of the embodiments of the invention, there is provided a wireless network system including an aggregation node and a plurality of subnodes, wherein:

each of the subnodes which monitor the condition of a specific object and acquire monitor data includes:

a time setting module configured to randomly set sleeping time and working time of the subnode itself according to a predetermined strategy; and a monitor data reporting module configured to report the monitor data to the aggregation node during the working time; and the aggregation node includes a subnode state judging module, a monitor data acquiring module, a monitor data estimating module and a data recording module, wherein:

the subnode state judging module is configured to judge a current state of each subnode;

the monitor data acquiring module is configured to, in case that the subnode state judging module judges that a subnode is currently in a working state, directly acquire the monitor data currently reported by the subnode, and send to the data recording module the acquired monitor data as the monitor data to be recorded corresponding to the subnode;

the monitor data estimating module is configured to, in case that the subnode state judging module judges that a subnode is currently in a sleeping state, estimate current monitor data of the subnode, and send to the data recording module an estimation value of the monitor data as the monitor data to be recorded corresponding to the subnode; and the data recording module is configured to receive the monitor data to be recorded sent from the monitor data acquiring module or the monitor data estimating module and perform recording.

According to another aspect of the embodiments of the invention, there is provided a wireless network node controlling method applied in a wireless network including an aggregation node and a plurality of subnodes, wherein the subnodes monitor the condition of a specific object and acquire monitor data, and the wireless network controlling method includes:

randomly setting in advance sleeping time and working time for each subnode according to a predetermined strategy;

judging, by the aggregation node, a current state of each subnode, and recording, by the aggregation node, the monitor data of the subnode according to the current state of the subnode, wherein:

in case that the subnode is currently in a working state, directly acquiring the monitor data currently reported by the subnode, and recording the acquired monitor data;

in case that the subnode is currently in a sleeping state, estimating current monitor data of the subnode according to a preset algorithm, and recording the estimate value of the monitor data.

According to another aspect of the embodiments of the invention, there is provided a gateway including the wireless network apparatus as described above.

According to a further aspect of the embodiments of the invention, there is provided a program product in which machine readable instruction codes are stored, wherein the instruction codes when being read and executed by a machine can perform the foregoing wireless network node controlling method.

According to another aspect of the embodiments of the invention, there is provided a storage medium carrying machine readable instruction codes, wherein the instruction codes when being read and executed by a machine can perform the foregoing wireless network node controlling method.

Various implementations of the embodiments of the invention will be presented in the following description, and the detailed description is intended to disclosure fully the preferred embodiments of the invention but not to limit the invention.

BRIEF DESCRIPTION OF THE DRAWINGS

The foregoing and other objects and advantages of the embodiments of the invention will be further described below in connection with the specific embodiments and with reference to the drawings in which identical or corresponding technical features or components will be denoted with identical or corresponding reference numerals and in which.

DETAILED DESCRIPTION OF THE INVENTION

Embodiments of the invention will be described in details below with reference to the drawings.

Figure 2:
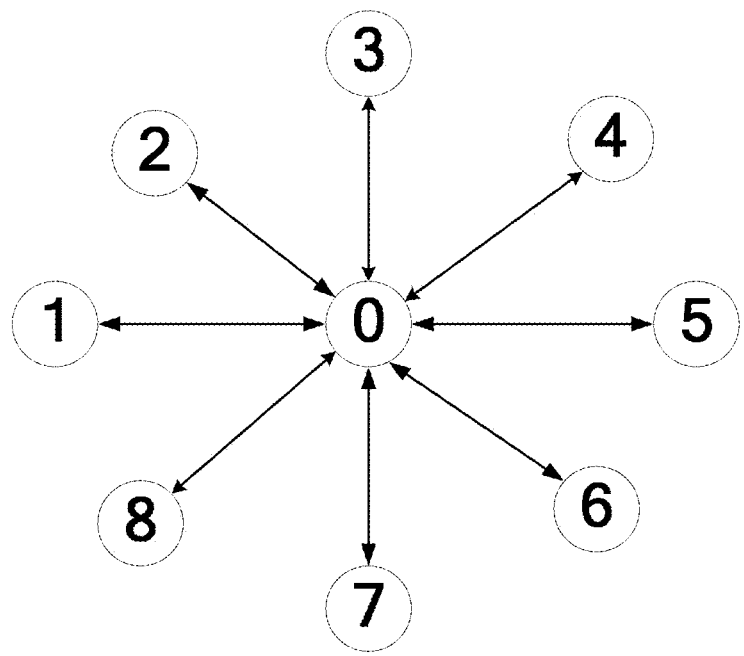
FIG. 2 is a schematic structural diagram of a star-like network.

A solution provided in an embodiment of the invention is applicable to the structure of a star-like wireless network including a central node and a plurality of subnodes. The star-like structure is a fundamental type of topology structure of a wireless ad hoc network. FIG. 2 illustrates a schematic diagram of the structure of a fundamental star-like network, where 0 to 9 represent nodes of the wireless network respectively, including a node 0 being a central node and nodes 1 to 8 being subnodes of the node 0 so that the respective subnodes communication with the central node respectively and the central node has the function of data aggregation. Therefore, the central node in the star-like network can also be referred to as an aggregation node.

Figure 3:
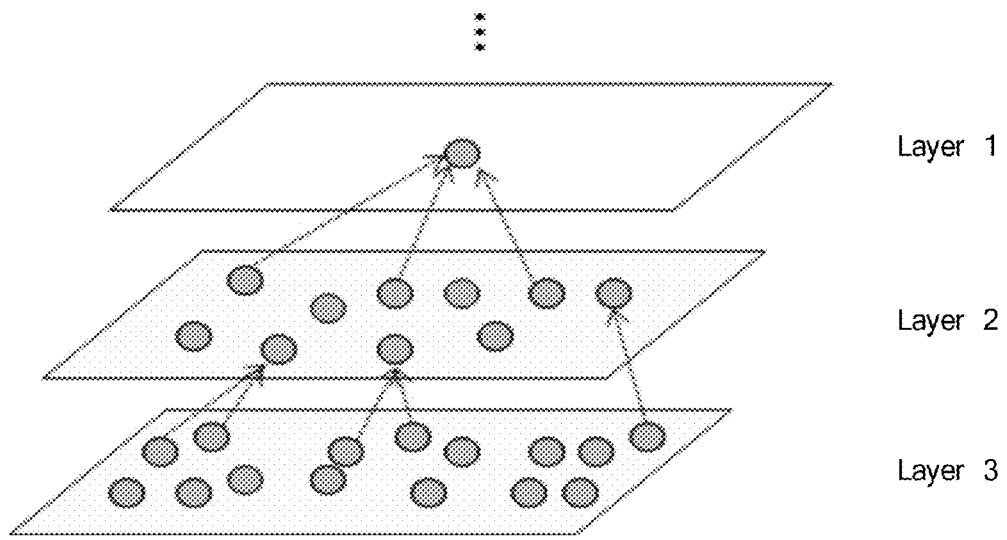
FIG. 3 is a schematic structural diagram of a layered network.
Figure 4:
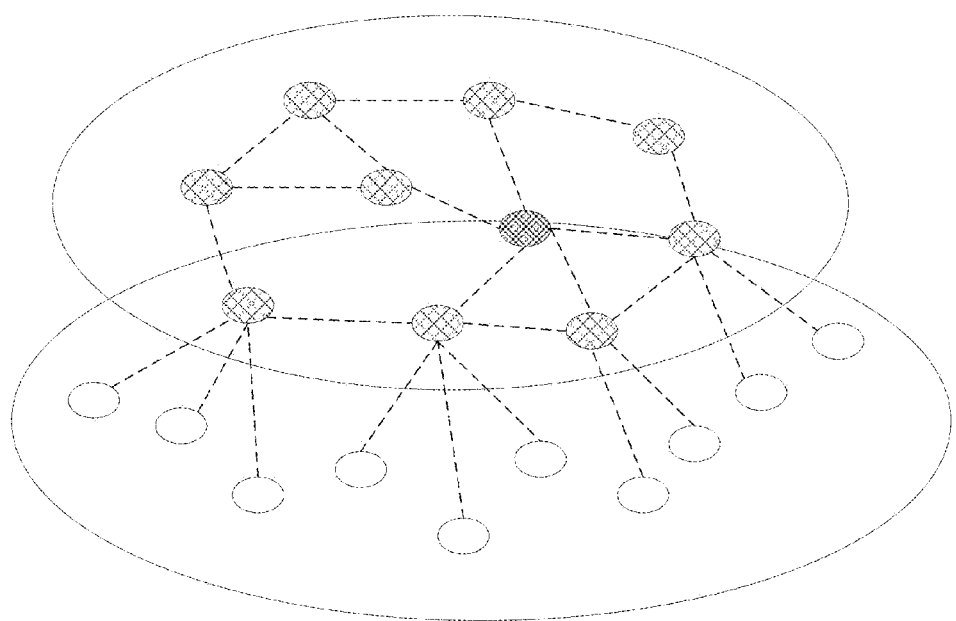
FIG. 4 is a schematic structural diagram of a clustered network.

In some complex application contexts of an ad hoc network, a network topology structure is frequently created as a layered structure, a clustered structure, etc., and FIG. 3 illustrates a schematic diagram of a layered structure, while FIG. 4 illustrates a schematic diagram of a clustered structure. Apparently the star-like structure is an elementary constitutive unit in the layered and clustered structures, and the aggregation node in the star-like structure also plays the role of a gateway node or a relay node.

The respective subnodes in the star-like structure network are distributed at different locations and configured to monitor the condition of a specific object and acquire monitor data. For example, the respective subnodes collect various physical signals of their ambient, such as temperature, humidity, pressure, gas components, etc., through a sensor built therein, convert the collected signals into corresponding monitor data, and report their own monitor data to the aggregation node. Apparently a specific application field of the solution according to the embodiment of the invention can be a wireless sensor network but will not be limited thereto. In the layered or clustered network structure, the aggregation node further reports the monitor data of the respective subnodes to its own upper node, which in turn reports the monitor data to a user-side equipment, and in a simple network, the aggregation node can alternatively report the monitor data directly to the user-side equipment or the user-side equipment itself can be an aggregation node without departing from the scope of the invention.

In the solution provided in the embodiment of the invention, the respective subnodes are provided with randomly set sleeping time and working time. In the case that a specific subnode is currently in a working state, the aggregation node directly acquires the monitor data currently reported by the subnode and records the acquired monitor data; and in the case that a specific subnode is currently in a sleeping state, the aggregation node estimates the current monitor data of the subnode according to a preset algorithm and records an estimation value of the monitor data.

According to the foregoing solution in the embodiment of the invention, sleeping time is prolonged flexibly for a subnode by setting the random working time and sleeping time for the subnode to thereby lower the energy consumption of the subnode. When a subnode in the sleeping state can not report any monitor data in the network, the aggregation node estimates the monitor data of the subnode according to the preset algorithm to thereby ensure the integrity of the monitor data throughout the network and hence improve the robustness, reliability and real time performance of the network system.

In an embodiment of the invention, there is provided a wireless network apparatus applied in a wireless network including an aggregation node and a plurality of subnodes. Particularly the wireless network apparatus can correspond to the aggregation node itself or be a functional module residing in the aggregation node or a functional entity separate from the aggregation node. The respective subnodes monitor the condition of a specific object and acquire and report monitor data to the wireless network apparatus. As can be appreciated, the wireless network apparatus can further transmit the monitor data to the aggregation node in the case that the wireless network apparatus is separate from the aggregation node.

Figure 5:
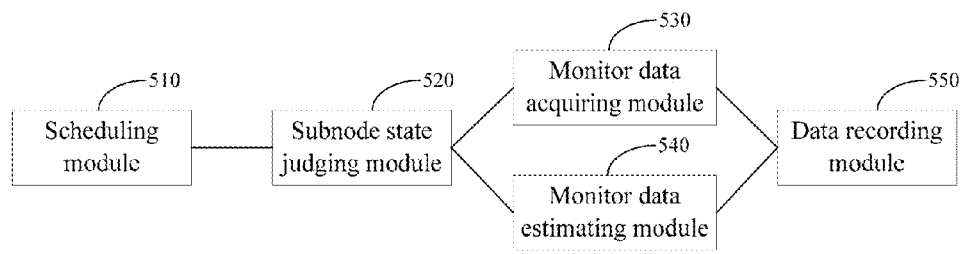
FIG. 5 is a schematic structural diagram of a wireless network apparatus according to an embodiment of the invention.

FIG. 5 illustrates a schematic structural diagram of a wireless network apparatus 500 provided for an embodiment of the invention, which includes a scheduling module 510, a subnode state judging module 520, a monitor data acquiring module 530, a monitor data estimating module 540 and a data recording module 550, wherein:

The scheduling module 510 is configured to randomly set in advance sleeping time and working time for each subnode according to a predetermined strategy and send the setting result to corresponding subnodes;

The subnode state judging module 520 is configured to judge a current state of each subnode;

The monitor data acquiring module 530 is configured to, in case that the subnode state judging module 520 judges that a subnode is currently in a working state, directly acquire the monitor data currently reported by the subnode, and send to the data recording module 550 the acquired monitor data as the monitor data to be recorded corresponding to the subnode;

The monitor data estimating module 540 is configured to, in case that the subnode state judging module 520 judges that a subnode is currently in a sleeping state, estimate current monitor data of the subnode according to a preset algorithm, and send to the data recording module 550 an estimation value of the monitor data as the monitor data to be recorded corresponding to the subnode; and The data recording module 550 is configured to receive the monitor data to be recorded sent from the monitor data acquiring module 530 or the monitor data estimating module 540 and perform recording.

In the present embodiment, the wireless network apparatus is responsible for randomly setting in advance the sleeping time and the working time for the respective subnodes. After the network is deployed, the scheduling module 510 randomly sets the sleeping time and the working time respectively for the respective subnodes and transmits the setting result to corresponding subnodes.

Figure 1:
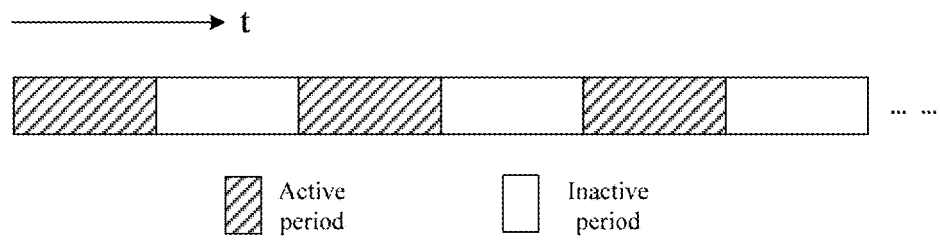
FIG. 1 is a schematic diagram of a divided period of time for communication of a wireless ad hoc network in the prior art.
Figure 6:
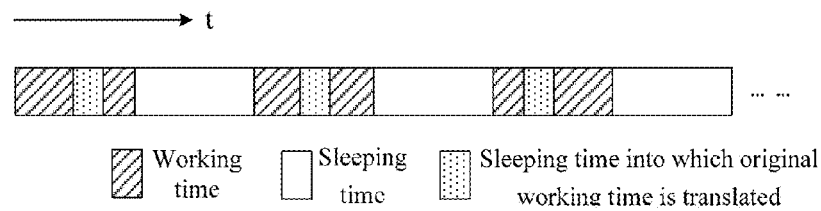
FIG. 6 is a schematic diagram of a setting of working time/sleeping time according to an embodiment of the invention.

As can be appreciated, the sleeping time and the working time of a subnode can be randomly set according to various specific strategies. For example, the duty ratio of the sleeping time and the working time of a subnode can be adjusted randomly. In a solution according to the embodiment of the invention, based upon the periodical working/sleeping mechanism of a subnode in the prior art (for example, as illustrated in FIG. 1), a random period of time is selected from the working period of time (the active period of time) of the subnode, and the selected period of time is set as the sleeping time. In another word, as shown in FIG. 6, a part of the original working period of time is translated into the sleeping time as compared with FIG. 1. Particularly the scheduling module 510 can select the random period of time by generating and then mapping a random number onto the temporal axis. Of course the scheduling module 510 can alternatively transmit the generated random number to the corresponding subnode, which in turn performs the operation of mapping, etc., by itself. With this solution, the sleeping period of a subnode is prolonged based upon the existing periodical working/sleeping mechanism for the purpose of conserving energy while ensuring compatibility with the existing communication protocol of a wireless ad hoc network.

The wireless network apparatus can perform the task of setting the sleeping time and the working time for the respective subnodes during initialization of the network, and of course this task can alternatively be performed periodically or as triggered in response to a specific event in order to accommodate a possible variation.

After the sleeping time and the working time is set for the respective subnodes, the network goes into an operation state, and during operation of the network, the aggregation node typically records monitor data of the respective subnodes periodically. Since the working/sleeping time of the respective nodes is irregular, different sub-nodes may be in different states in any period of time for which the aggregation node records the monitor data. The subnode state judging module 520 firstly judges a current state of each subnode: for a subnode currently in a working state, the monitor data acquiring module 530 directly acquires the monitor data currently reported by the subnode and transmits the acquired monitor data to the data recording module 550 for recording, and for a subnode currently in a sleeping state, the monitor data estimating module 540 estimates current monitor data of the subnode according to a preset algorithm and then transmits an estimation value of the monitor data to the data recording module 550 for recording.

Since spatial distributions of the respective subnodes in the star-like structure network are correlated to each other to some extent, the monitor data estimating module 540 can estimate the current monitor data of a subnode in a sleeping state according to the monitor data reported by subnodes currently in a working state. Of course, temporal distributions of data reported by a single subnode itself are also correlated, so current monitor data of a subnode in a sleeping state can also be estimated from historical monitor data reported by the subnode through interpolation. As can be appreciated, the monitor data estimating module 540 can adopt an estimation algorithm performed in various ways, and the embodiment of the invention will not be limited in this respect.

Since a subnode in a working state can report monitor data in an autonomic way, the subnode state judging module 520 can be specifically configured to judge whether a subnode is in a working state or a sleeping state, according to whether the sub-node currently reports monitor data. If the subnode can currently report monitor data, then it is definitely in a working state; otherwise, it is in a sleeping state. That is, the state of the subnode can be judged without any extra interaction of instructions. Furthermore with this solution, if a subnode is worn down or the energy thereof is used up, then the subnode state judging module 520 can also judge that the subnode is in a sleeping state, and before the subnode is replaced or the network is redeployed, the monitor data estimating module 540 will estimate the monitor data of the subnode to avoid an absence of its monitor data to thereby ensure the robustness and reliability throughout the network.

Figure 7:
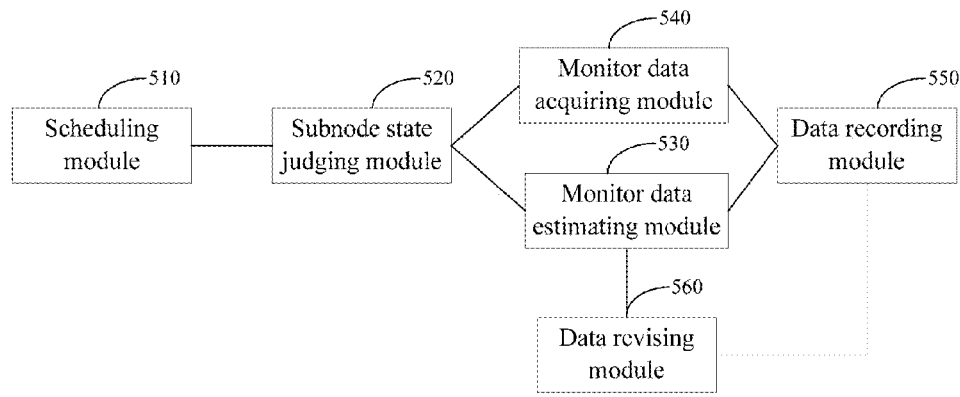
FIG. 7 is another schematic structural diagram of a wireless network apparatus according to an embodiment of the invention.

Referring to FIG. 7, the wireless network apparatus provided in the embodiment of the invention can further include a data revising module 560 configured to, after the monitor data acquiring module 530 acquires the monitor data currently reported by a subnode, revise the estimation value of the monitor data recorded by the data recording module 550 by using the monitor data currently reported by the subnode.

As can be appreciated from the solution according to the foregoing embodiment, in any period of time for which the aggregation node records monitor data, if a subnode is in a working state, then the data recording module 550 finally records real monitor data reported by the subnode; and if a subnode is in a sleeping state, then the data recording module 550 finally records an estimation value of the monitor data of the subnode. Particularly the data recording module 550 can allocate different identifiers respectively when recording the two types of data. In next period of time for which the aggregation node records monitor data, the data revising module 560 can revise the previously recorded estimation value of the monitor data by real monitor data reported recently from the subnode.

As can be appreciated, the estimation value of the monitor data can be revised by revising a formula of the estimation algorithm and recalculating the estimation value. If the monitor data estimating module 540 performs estimation from historical data, then the real monitor data reported recently from the subnode will be used to revise the estimation value of the monitor data corresponding to the subnode itself; and if the monitor data estimating module 540 performs estimation from spatial correlation, then the real monitor data reported recently from the subnode can further be used to revise an estimation value of monitor data corresponding to another subnode.

Figure 8:
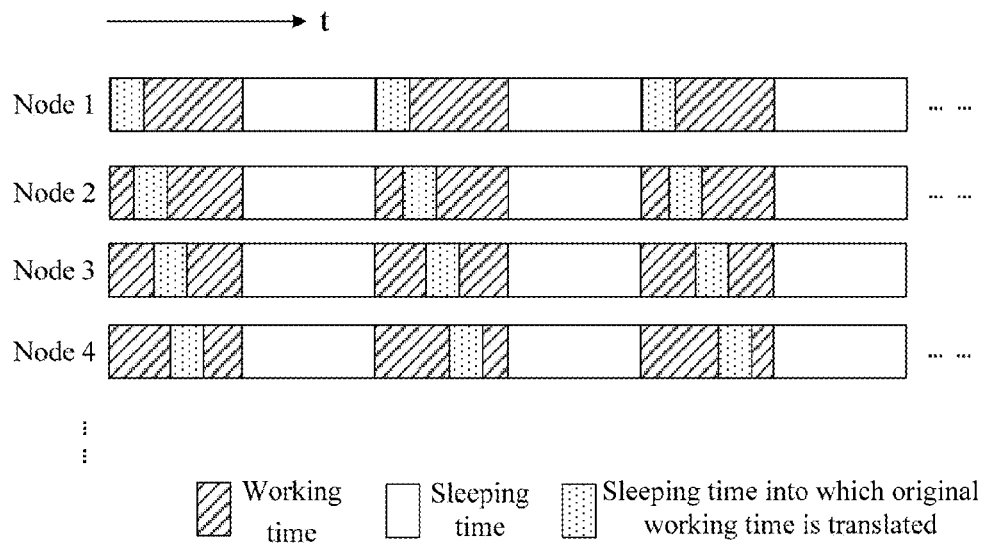
FIG. 8 is a schematic diagram of another setting of working time/sleeping time according to an embodiment of the invention.

In the foregoing embodiment, the wireless network apparatus randomly sets in advance the sleeping/working time collectively for the respective subnodes. Therefore the wireless network apparatus can perform better scheduling of a wireless resource by setting different sleeping time/working time for the respective subnodes. Referring to FIG. 8, the scheduling module 510 sets sleeping time for the respective subnodes in different periods of time so that the working time of the respective subnodes can also be staggered to some extent to thereby further lower the probability of a collision of data reporting. Of course FIG. 8 illustrates merely an example of setting the sleeping/working time for a plurality of nodes, which shall not be constructed as limiting the solution according to the embodiment of the invention.

Particularly the scheduling module 510 can set flexibly the length of a sleeping period of time of a subnode dependent upon other practical demands, for example, according to at least one of the following strategies:

1) The length of the selected random period of time during the working time period can be determined dependent upon remaining energy of the respective subnodes. A longer sleeping period of time can be selected for a subnode with a smaller amount of remaining energy, and on the contrary, a shorter sleeping period of time can be selected for a subnode with a larger amount of remaining energy, thereby balancing energy consumption throughout the network;

2) The length of the selected random period of time during the working time period can be determined dependent upon a congestion condition of the network. When the network is seriously congested, a longer sleeping period of time can be selected collectively for the respective subnodes to alleviate a collision of accesses and improve the real time performance of the network; and 3) The length of the selected random period of time during the working time period can be determined dependent upon a demand for the precision of the monitor data. This solution can be performed collectively for all of the nodes or separately for the respectively subnodes.

The foregoing several strategies of setting the length of a sleeping period of time of a subnode can be performed separately or in combination. Of course the embodiment of the invention will not be limited thereto.

With the solution provided in the foregoing embodiment, the wireless network apparatus randomly sets in advance the sleeping/working time for the respective subnodes and distribute the setting result all at one time to the respective subnodes, and before the set sleeping/working time is reset, there is no other interaction of coordination instructions required between the wireless network apparatus and the subnodes and of course there is not any interaction of coordination instructions required between the subnodes, thereby reducing the number of interaction instructions and hence lowering energy consumption of the network as compared with the prior art.

In a specific implementation, above mentioned scheduling module 510, subnode state judging module 520, monitor data acquiring module 530, monitor data estimating module 540 and data revising module 560 may be achieved, for example, in the form of a processor, and above mentioned data recording module 550 may utilize, for example, the form of a memory or an interface.

An embodiment of the invention further provides a wireless network system including a plurality of subnodes and the foregoing wireless network apparatus. Particularly the wireless network apparatus can correspond to the aggregation node in the star-like network or be a functional module residing in the aggregation node. The respective subnodes monitor the condition of a specific object, acquire monitor data and report the monitor data to the wireless network apparatus. The wireless network apparatus can prolong more flexibly sleeping time for the subnodes by setting random working time and sleeping time for the subnodes to thereby lower energy consumption of the subnodes. The respective subnodes report monitor data respectively in the set working time. When a subnode in a sleeping state can not report any monitor data, the wireless network apparatus estimates the monitor data of the subnode according to a preset algorithm to thereby ensure the integrity of the monitor data throughout the network and hence improve the robustness and reliability of the system. Furthermore in the network system provided in the embodiment of the invention, an interval of time at which parts of the subnodes transmit data packets can be varied dynamically or the number of transmitted data packets thereof can be reduced irregularly dependent upon a congestion condition of the network to thereby alleviate a collision of access and improve the real time performance of the network.

As described above, a specific form in which the wireless network system is implemented can be a wireless sensor network system, for example.

An embodiment of the invention further provides a gateway including the foregoing wireless network apparatus. As described above, this gateway therefore can set random working time and sleeping time for its lower subnodes to thereby conserve energy of a relevant network system. When a subnode in a sleeping state can not report any monitor data, the gateway can estimate its monitor data according to a preset algorithm to thereby avoid an absence of the monitor data, thus ensuring the integrity of the monitor data throughout the network and hence improving the robustness and reliability of the network system. Furthermore in the gateway according to the embodiment of the invention, an interval of time at which parts of the subnodes transmit data packets can be varied dynamically or the number of transmitted data packets thereof can be reduced irregularly dependent upon a congestion condition of the network to thereby alleviate a collision of access and improve the real time performance of the network.

Furthermore in an application of the gateway provided in the embodiment of the invention in a heterogeneous network, if the upper gateway is capable of data estimation, then the amount of information acquired from the lower network can be reduced, and also the number of uploaded data packets can be reduced as appropriate to thereby reduce a payload of a data field of the upper network while transporting packets to the upper layer, and to improve the efficiency of transporting and processing data.

On the other hand, storage and calculation of data can be distributed to gateways at respective layers in a layered network to thereby reduce a burden of storage and calculation at an upper gateway and improve the efficiency of data storage and calculation. In a sophisticated network structure, an overall layered estimation table can be created in an estimation formula, and in the case of sufficient relevant data, data of the entire network can be estimated from a very small amount of data at the top layer of the network.

An embodiment of the invention further provides another wireless network system including an aggregation node and a plurality of subnodes of the aggregation node.

Figure 9:
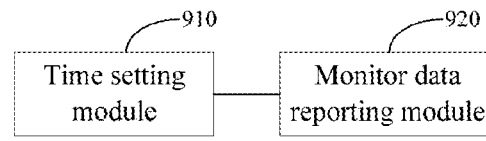
FIG. 9 is a schematic structural diagram of a subnode according to an embodiment of the invention.

Particularly the respective subnodes are configured to monitor the condition of a specific object and acquire monitor data, and referring to FIG. 9, each of the subnodes can include:

A time setting module 910 is configured to randomly set sleeping time and working time of the subnode itself; and A monitor data reporting module 920 is configured to report the monitor data to the aggregation node during the working time.

Furthermore those skilled in the art can appreciate that the subnode shall further include a fundamental power supply block, data acquisition module and data processing module, etc., which have not been illustrated in FIG. 9.

In a specific implementation, above mentioned time setting module 910 and monitor data reporting module 920 may be achieved, for example, in the form of a processor.

Figure 10:
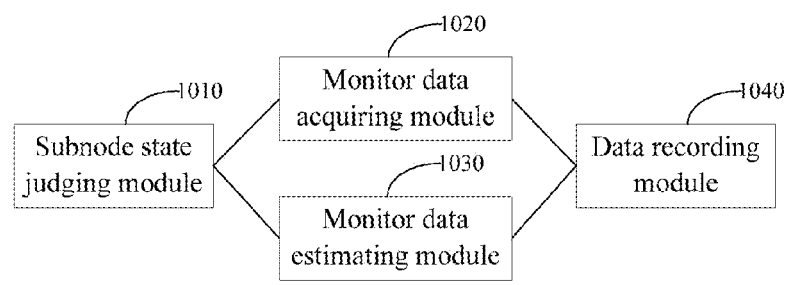
FIG. 10 is a schematic structural diagram of an aggregation node according to an embodiment of the invention.

Referring to FIG. 10, the aggregation node in the present embodiment includes a subnode state judging module 1010, a monitor data acquiring module 1020, a monitor data estimating module 1030 and a data recording module 1040, where the functions and configurations of these modules can be the same as or similar to the subnode state judging module 520, the monitor data acquiring module 530, the monitor data estimating module 540 and the data recording module 550 respectively in the foregoing embodiment, and a repeated description thereof will be omitted here.

Figure 11:
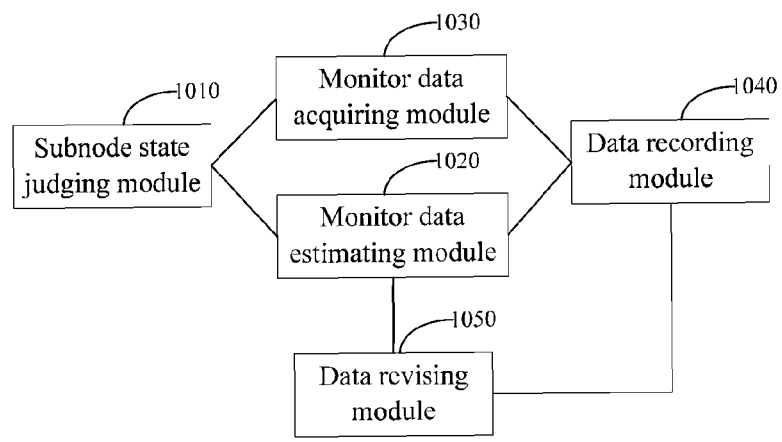
FIG. 11 is another schematic structural diagram of an aggregation node according to an embodiment of the invention.

Referring to FIG. 11, the aggregation node according to the present embodiment can further include a data revising module 1150 configured to, after the monitor data acquiring module 1020 acquires the monitor data currently reported by the subnode, revise an estimation value of the monitor data recorded by the data recording module 1040 by using the monitor data currently reported by the subnode. The function and configuration of the revising module 1150 can be the same as or similar to the revising module 560 in the previous embodiment, and a repeated description thereof will be omitted here.

In a specific implementation, above mentioned scheduling module 510, subnode state judging module 1010, monitor data acquiring module 1020, monitor data estimating module 1030 and data revising module 1150 may be achieved, for example, in the form of a processor, and above mentioned data recording module 1040 may utilize, for example, the form of a memory or an interface.

As apparent from comparing FIG. 10 with FIG. 5 as well as FIG. 11 with FIG. 7, the only difference of the aggregation node according to the present embodiment from the wireless network apparatus according to the previous embodiment lies in the absence of the scheduling module 510. In the present embodiment, the respective subnodes are provided respectively with the time setting module 910 to randomly set sleeping time and working time of the subnode itself. The time setting module 910 can set the sleeping time and the working time according to a specific strategy substantially similar to the scheduling module 510 except for the only difference that the respective subnodes set the sleeping time and the working time independently of each other, and therefore it is not necessary to consider correlation between the subnodes collectively.

For example, based upon the periodical working/sleeping mechanism of a subnode, the time setting module 910 can select a random period of time from its working time period (the active portion) and set the selected period of time as the sleeping time. The time setting module 910 can also adjust the length of a sleeping period of time of the subnode dependent upon remaining energy of the subnode, a demand of the system for the precision of monitor data or a congestion condition of the network.

In the application of the solution provided in the present embodiment, the respective subnodes set the sleeping/working time in a totally autonomic way without involving the aggregation node. Interaction of coordination instructions between the aggregation node and the subnodes can be further reduced as compared with the previous approach in which the wireless network device (or aggregation node) sets the sleeping/working time for the respective subnodes.

As described above, a specific form in which the wireless network system is implemented can be a wireless sensor network system, for example.

Figure 12:
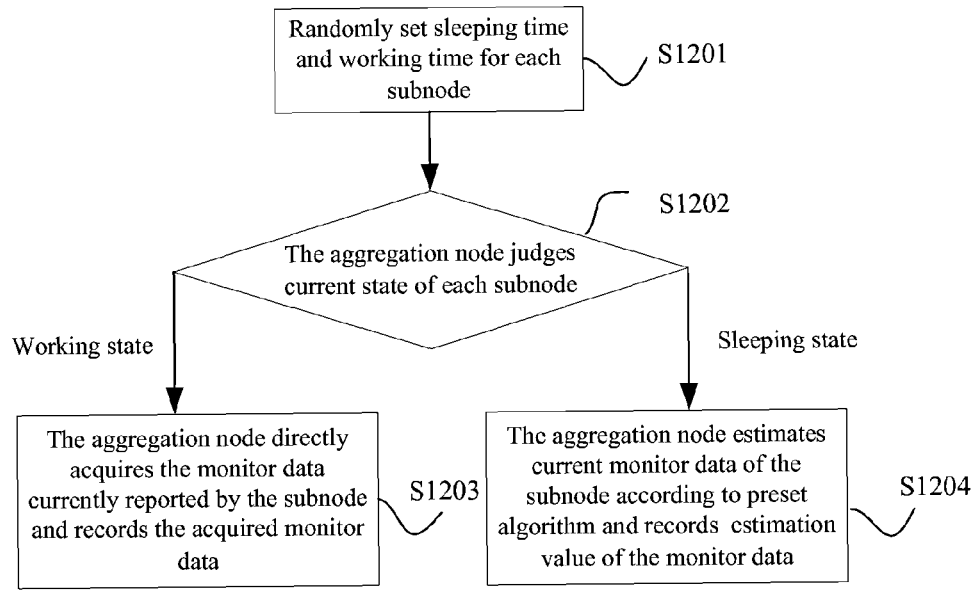
FIG. 12 is a flow chart of a node control method according to an embodiment of the invention.

An embodiment of the invention further provides a wireless network node controlling method applied in a wireless network including an aggregation node and a plurality of subnodes, where the respective subnodes monitor a condition of a specific object and acquire monitor data, and referring to FIG. 12, the method can include the following steps:

In the step S1201, sleeping time and working time for each subnode is randomly set in advance according to a predetermined strategy;

Particularly the predetermined strategy can include: on the basis of a periodic working/sleeping mechanism of the subnode, selecting a random period of time during the working time period, and setting the selected period of time as the sleeping time.

In a specific implementation, the step S1201 can be performed by the aggregation node, which sets randomly the sleeping time and working time for each subnode and sends the setting result to corresponding subnodes.

Particularly the aggregation node can further set flexibly the length of a sleeping period of time of the subnode dependent upon other practical demands, for example, according to at least one of the following policies:

1) The length of the selected random period of time during the working time period can be determined dependent upon remaining energy of the respective subnodes. A longer sleeping period of time can be selected for a subnode with a smaller amount of remaining energy, and on the contrary, a shorter sleeping period of time can be selected for a subnode with a larger amount of remaining energy, thereby balancing energy consumption throughout the network;

2) The length of the selected random period of time during the working time period can be determined dependent upon a congestion condition of the network. When the network is seriously congested, a longer sleeping period of time can be selected collectively for the respective subnodes to alleviate a collision of accesses and improve the real time of the network; and 3) The length of the selected random period of time during the working time period can be determined dependent upon a demand for the precision of the monitor data. This solution can be performed collectively for all of the nodes or separately for the respectively subnodes.

The foregoing several policies of setting the length of a sleeping period of time of a subnode can be performed separately or in combination. Of course the embodiment of the invention will not be limited thereto.

For a specific strategy according to which the aggregation node sets the sleeping time and the working time, reference can be made to a relevant description of the time setting module 510, and a repeated description thereof will be omitted here.

Alternatively the step S1201 can be performed by the respective subnodes themselves, that is, the respective subnodes can randomly set the sleeping time and the working time in an autonomic way.

Particularly the respective subnode can further set flexibly the length of a sleeping period of time thereof dependent upon other practical demands, for example, according to at least one of the following policies:

1) The length of the selected random period of time during the working time period can be determined dependent upon remaining energy of the respective subnodes. A longer sleeping period of time can be selected for a subnode with a smaller amount of remaining energy, and on the contrary, a shorter sleeping period of time can be selected for a subnode with a larger amount of remaining energy, thereby balancing energy consumption throughout the network;

2) The length of the selected random period of time during the working time period can be determined dependent upon a congestion condition of the network. When the network is seriously congested, a longer sleeping period of time can be selected for the respective subnodes to alleviate a collision of accesses and improve the real time of the network; and 3) The subnodes can determine the length of the selected random period of time during the working time period dependent upon a demand of the system for the precision of the monitor data.

The foregoing several policies of setting the length of a sleeping period of time of a subnode can be performed separately or in combination. Of course the embodiment of the invention will not be limited thereto.

Particularly for a specific strategy according to which the respective subnodes independently set the sleeping time and the working time, reference can be made to the relevant description of the time setting module 910, and a repeated description thereof will be omitted here.

In the step S1202, the aggregation node judges a current state of each subnode, and if the subnode is currently in a working state, then the flow goes to the step S1203, or if the subnode is currently in a sleeping state, then the flow goes to the step S1204.

Particularly the aggregation node can judge whether the subnode is in a working state or a sleeping state, according to whether the sub-node currently reports monitor data or not. If the subnode currently can report monitor data, then it is definitely in a working state; otherwise, it is in a sleeping state. That is, the state of the subnode can be judged without any extra interaction of instructions between the aggregation node and the subnode.

In the step S1203, the aggregation node directly acquires the monitor data currently reported by the subnode and records the acquired monitor data; and In the step S1204, the aggregation node estimates current monitor data of the subnode according to a preset algorithm and records an estimation value of the monitor data.

Particularly the aggregation node can estimate current monitor data of a subnode in a sleeping state according to the monitor data reported by subnodes currently in a working state. Of course, temporal distributions of data reported by a single subnode itself are also correlated, so current monitor data of a subnode in a sleeping state can also be estimated from historical monitor data reported by the subnode through interpolation. As can be appreciated the aggregation node can adopt an estimation algorithm performed in various ways, and the embodiment of the invention will not be limited in this respect.

Figure 13:
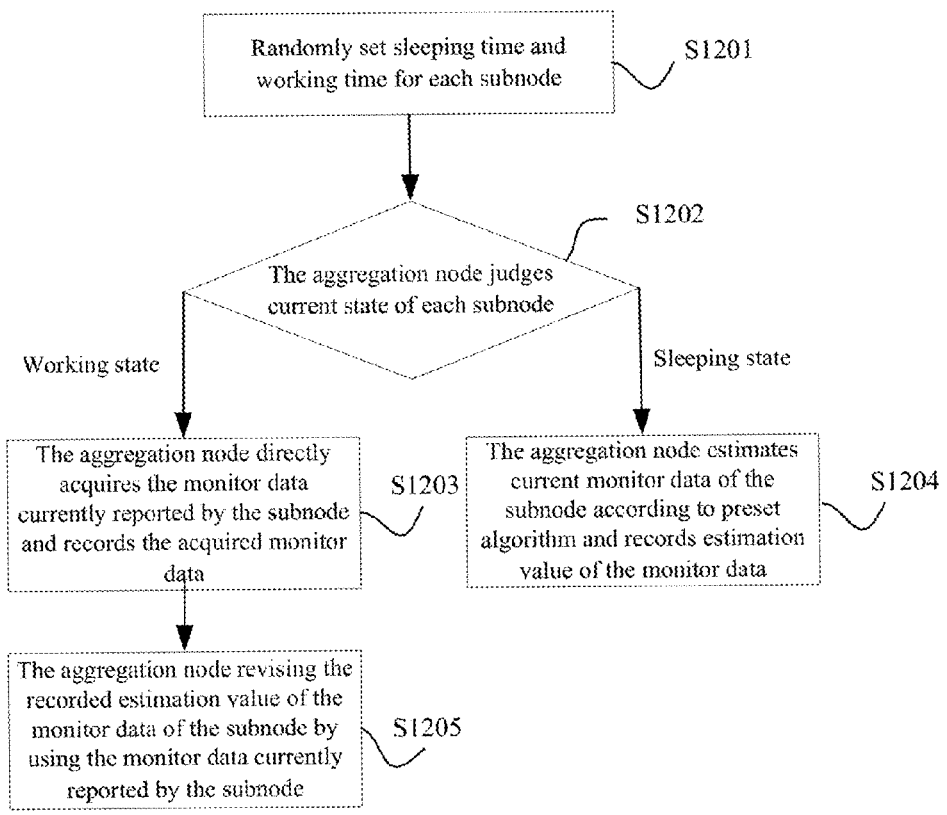
FIG. 13 is another flow chart of a node control method according to an embodiment of the invention.

Referring to FIG. 13, an embodiment of the invention further provides a wireless network node controlling method which, after the step S1203 of the aggregation node acquiring the monitor data currently reported by the subnode which is currently in the working state, can further include the step S1205 of the aggregation node revising the recorded estimation value of the monitor data of the subnode by using the monitor data currently reported by the subnode.

As can be appreciated, the estimation value of the monitor data can be revised by revising a formula of the estimation algorithm and recalculating the estimation value. If the aggregation node performs estimation from historical data, then real monitor data reported recently from the subnode will be used to revise the estimation value of the monitor data corresponding to the subnode; and if the aggregation node performs estimation from spatial correlation, then the real monitor data reported recently from the subnode can further be used to revise an estimation value of monitor data corresponding to another subnode.

The wireless network node controlling method according to the embodiment of the invention can be applied, for example, in a wireless sensor network system, where respective subnodes in the wireless network can be configured as sensor nodes in the wireless sensor network.

The respective steps in the method according to the embodiments of the invention illustrated in FIG. 12 and FIG. 13 and their specific operations can be performed, for example, by the wireless network apparatus or the wireless network system and the respective constituent modules according to the invention as described above with reference to FIG. 5 to FIG. 11 and can attain similar technical benefits. For specific details thereof, reference can be made to the foregoing description, and a repeated description thereof will be omitted here.

Furthermore it shall be noted that the functions of the apparatus and the system and the series of processes of the method according to the foregoing respective embodiments can be performed in hardware, firmware, software and/or a combination thereof. In the case of being performed in software and/or firmware, a program constituting the software is installed from a storage medium or a network to a computer with a dedicated hardware structure, e.g., a general-purpose personal computer 1400 illustrated in FIG. 14, e.g., which can perform various functions and processes when various programs are installed thereon.

Figure 14:
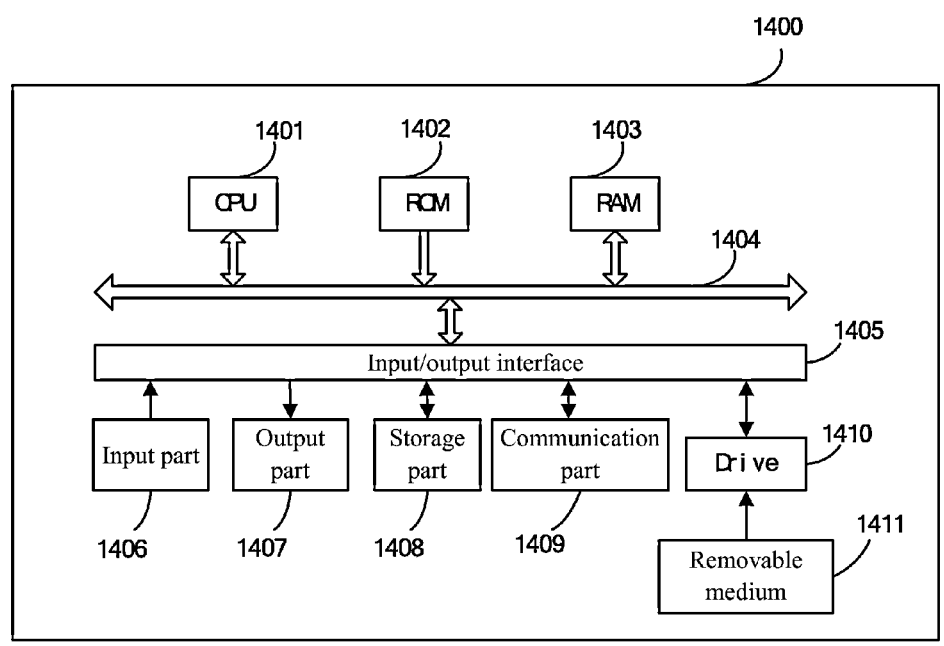
FIG. 14 is a block diagram of an illustrative structure of a personal computer as an information processing apparatus adopted in an embodiment of the invention.

In FIG. 14, a Central Processing Unit (CPU) 1401 performs various processes according to a program stored in a Read Only Memory (ROM) 1402 or loaded from a storage part 1408 into a Random Access Memory (RAM) 1403 in which data required when the CPU 1401 performs the various processes is also stored as needed.

The CPU 1401, the ROM 1402 and the RAM 1403 are connected to each other via a bus 1404 to which an input/output interface 1405 is also connected.

The following components are connected to the input/output interface 1405: an input part 1406 including a keyboard, a mouse, etc.; an output part 14907 including a display, e.g., a Cathode Ray Tube (CRT), a Liquid Crystal Display (LCD), etc., a speaker, etc.; a storage port 1408 including a hard disk, etc.; and a communication part 1409 including a network interface card, e.g., an LAN card, a modem, etc. The communication part 1409 performs a communication process over a network, e.g., the Internet, etc.

A drive 1410 is also connected to the input/output interface 1405 as needed. A removable medium 1411, e.g., a magnetic disk, an optical disk, an optic-magnetic disk, a semiconductor memory, etc., can be installed on the drive 1410 as needed so that a computer program fetched therefrom can be installed into the storage part 1408.

In the case that the foregoing series of processes are performed in software, a program constituting the software is installed from a network, e.g., the Internet, etc., or a storage medium, e.g., the removable medium 1411, etc.

Those skilled in the art shall appreciate that such a storage medium will not be limited to the removable medium 1411 illustrated in FIG. 14 in which the program is stored and which is distributed separately from the apparatus to provide a user with the program. Examples of the removable medium 1411 include a magnetic disk (including a Floppy Disk™, an optical disk (including a Compact Disk-Read Only memory (CD-ROM) and a Digital Versatile Disk (DVD)), an optic-magnetic disk (including a Mini Disk (MD™)) and a semiconductor memory. Alternatively the storage medium can be the ROM 1402, the hard disk included in the storage port 1408, etc., in which the program is stored and which is distributed together with the apparatus including the same to the user.

It shall further be noted that the steps in the foregoing series of processes can naturally be performed in a temporal sequence in the order as described but will not necessarily be performed in a temporal sequence. Some of the steps can be performed concurrently or separately from each other.

Apparently an embodiment of the invention further discloses a program product in which machine readable instruction codes are stored, where the instruction codes when being read and executed by a machine can perform the wireless network node controlling method according to the previous embodiment of the invention. Also an embodiment of the invention further discloses a storage medium in which machine readable instruction codes are borne, where the instruction codes when being read and executed by a machine can perform the wireless network node controlling method according to the previous embodiment of the invention.

With respect to implementations including the foregoing embodiments, the following appendixes are also disclosed:

Appendix 1. A wireless network apparatus applied in a wireless network having a plurality of subnodes which monitor the condition of a specific object and acquire monitor data, the wireless network apparatus comprising: a scheduling module, a subnode state judging module, a monitor data acquiring module, a monitor data estimating module and a data recording module, wherein:

the scheduling module is configured to randomly set in advance sleeping time and working time for each subnode according to a predetermined strategy, and send the setting result to corresponding subnodes;

the subnode state judging module is configured to judge a current state of each subnode;

the monitor data acquiring module is configured to, in case that the subnode state judging module judges a subnode is currently in a working state, directly acquire the monitor data currently reported by the subnode, and send to the data recording module the acquired monitor data as the monitor data to be recorded corresponding to the subnode;

the monitor data estimating module is configured to, in case that the subnode state judging module judges a subnode is currently in a sleeping state, estimate current monitor data of the subnode according to a preset algorithm, and send to the data recording module an estimation value of the monitor data as the monitor data to be recorded corresponding to the subnode; and the data recording module is configured to receive the monitor data to be recorded sent from the monitor data acquiring module or the monitor data estimating module and perform recording.

Appendix 2. The wireless network apparatus according to Appendix 1, wherein the subnode state judging module is specifically configured to judge a subnode is currently in the working state or the sleeping state based on whether the subnode currently reports the monitor data or not.

Appendix 3. The wireless network apparatus according to Appendix 1 or 2, wherein the scheduling module is specifically configured to:

on a basis of periodic working/sleeping mechanism of a subnode, select a random period of time during working time period and set the selected period of time as the sleeping time of the subnode.

Appendix 4. The wireless network apparatus according to Appendix 3, wherein the scheduling module is specifically configured to:

determine the length of the selected random period of time during the working time period dependent upon remaining energy of each subnode; and/or determine the length of the selected random period of time during the working time period dependent upon a congestion condition of the network; and/or determine the length of the selected random period of time during the working time period dependent upon a demand for the precision of the monitor data.

Appendix 5. The wireless network apparatus according to Appendix 1 or 2, wherein the monitor data estimating module is specifically configured to:

estimate current monitor data reported by a subnode in the sleeping state according to historical monitor data reported by the subnode; or estimate current monitor data reported by a subnode in the sleeping state according to the monitor data reported by subnodes currently in the working state.

Appendix 6. The wireless network apparatus according to Appendix 1 or 2, further comprising:

a data revising module configured to, after the monitor data acquiring module acquires the monitor data currently reported by a subnode, revise the estimation value of the monitor data recorded by the data recording module by using the monitor data currently reported by the subnode.

Appendix 7. A wireless network system, comprising a plurality of subnodes and the wireless network device according to any of Appendixes 1 to 6.

Appendix 8. A wireless network system, comprising an aggregation node and a plurality of subnodes, wherein:

each of the subnodes which monitor the condition of a specific object and acquire monitor data comprises:
- a time setting module configured to randomly set sleeping time and working time of the subnode itself according to a predetermined strategy; and
- a monitor data reporting module configured to report the monitor data to the aggregation node during the working time; and the aggregation node comprises a subnode state judging module, a monitor data acquiring module, a monitor data estimating module and a data recording module, wherein:
- the subnode state judging module is configured to judge a current state of each subnode;
- the monitor data acquiring module is configured to, in case that the subnode state judging module judges a subnode is currently in a working state, directly acquire the monitor data currently reported by the subnode, and send to the data recording module the acquired monitor data as the monitor data to be recorded corresponding to the subnode;
- the monitor data estimating module is configured to, in case that the subnode state judging module judges a subnode is currently in a sleeping state, estimate current monitor data of the subnode, and send to the data recording module an estimation value of the monitor data as the monitor data to be recorded corresponding to the subnode; and
- the data recording module is configured to receive the monitor data to be recorded sent from the monitor data acquiring module or the monitor data estimating module and perform recording.

Appendix 9. The wireless network system according to Appendix 8, wherein the time setting module is configured to:

on a basis of periodic working/sleeping mechanism of the subnode, select a random period of time during working time period and set the selected period of time as the sleeping time.

Appendix 10. The wireless network system according to Appendix 9, wherein the time setting module is configured to:

determine the length of the selected random period of time during the working time period dependent upon remaining energy of the subnode; and/or determine the length of the selected random period of time during the working time period dependent upon a congestion condition of the network; and/or determine the length of the selected random period of time during the working time period dependent upon a demand of the system for the precision of the monitor data.

Appendix 11. A wireless network node controlling method applied in a wireless network including an aggregation node and a plurality of subnodes, said subnodes monitoring the condition of a specific object and acquiring monitor data, the wireless network controlling method comprising:

randomly setting in advance sleeping time and working time for each subnode according to a predetermined strategy;

judging, by the aggregation node, a current state of each subnode, and recording, by the aggregation node, the monitor data of the subnode according to the current state of the subnode, wherein:
- in case that the subnode is currently in a working state, directly acquiring the monitor data currently reported by the subnode, and recording the acquired monitor data;
- in case that the subnode is currently in a sleeping state, estimating current monitor data of the subnode according to a preset algorithm, and recording an estimate value of the monitor data.

Appendix 12. The method according to Appendix 11, wherein the process of judging a current state of each subnode comprises:

judging whether the subnode is currently in the working state or the sleeping state based on whether the subnode currently reports the monitor data or not.

Appendix 13. The method according to Appendix 11, wherein the process of randomly setting sleeping time and working time for each subnode comprises:

independently randomly setting, by each subnode, the sleeping time and the working time in an autonomic way; or randomly setting, by the aggregation node, the sleeping time and the working time for each subnode, and sending, by the aggregation node, the setting result to corresponding subnode.

Appendix 14. The method according to any of Appendixes 11 to 13, wherein the process of randomly setting sleeping time and working time for each subnode comprises:

on a basis of periodic working/sleeping mechanism of the subnode, selecting a random period of time during the working time period, and setting the selected period of time as the sleeping time.

Appendix 15. The method according to Appendix 14, wherein the process of selecting a random period of time during the working time period comprises:

determining the length of the selected random period of time during the working time period dependent upon remaining energy of the respective subnodes; and/or determining the length of the selected random period of time during the working time period dependent upon a congestion condition of the network; and/or determining the length of the selected random period of time during the working time period dependent upon a demand for the precision of monitor data.

Appendix 16. The method according to any of Appendixes 11 to 13, wherein the process of estimating the current monitor data of the subnode according to a preset algorithm comprises:

estimating current monitor data reported by a subnode in the sleeping state according to historical monitor data reported by the subnode; or estimating current monitor data reported by a subnode in the sleeping state according to the monitor data reported by subnodes currently in the working state.

Appendix 17. The method according to any of Appendixes 11 to 13, after acquiring the monitor data currently reported by a subnode which is currently in the working state, further comprising:

revising the recorded estimation value of the monitor data of the subnode by using the monitor data currently reported by the subnode.

Appendix 18. A gateway, comprising the wireless network apparatus according to any of Appendixes 1 to 6.

Appendix 19. A program product in which machine readable instruction codes are stored, wherein the instruction codes when being read and executed by a machine can perform the method according to any of Appendixes 11 to 17.

Appendix 20. A storage medium carrying machine readable instruction codes, wherein the instruction codes when being read and executed by a machine can perform the method according to any of Appendixes 11 to 17.

Although the invention and the advantages thereof have been described in details, it shall be appreciated that various modifications, substitutions and variations can be made without departing from the spirit and scope of the invention as defined in the appended claims. Furthermore the terms "include", "comprise" and any variants thereof in the embodiments of the invention are intended to encompass nonexclusive inclusion so that a process, method, article or device including a series of elements includes both those elements and one or more other elements which are not listed explicitly or an element(s) inherent to the process, method, article or device. Unless stated otherwise, an element being defined in a sentence "include/comprise a(n) . . . " will not exclude presence of an additional identical element(s) in the process, method, article or device including the element.

The invention claimed is:

1. A wireless network apparatus applied in a wireless network having a plurality of subnodes which monitor the condition of a specific object and acquire monitor data, the wireless network apparatus comprising:
a processor configured to:
randomly set in advance sleeping time and working time for each subnode according to a predetermined strategy, and send the setting result to corresponding subnodes;
judge a current state of each subnode; and
when a subnode is currently in a working state, directly acquire the monitor data currently reported by the subnode, and send to a memory the acquired monitor data as the monitor data to be recorded corresponding to the subnode;
when a subnode is currently in a sleeping state, estimate current monitor data of the subnode, and send to the memory an estimation value of the monitor data as the monitor data to be recorded corresponding to the subnode; and
an interface configured to receive the monitor data to be recorded and perform recording.

2. The wireless network apparatus according to claim 1, wherein the processor is configured to judge a subnode is currently in the working state or the sleeping state based on whether the subnode currently reports the monitor data or not.

3. The wireless network apparatus according to claim 1, wherein the processor is configured to, on a basis of periodic working/sleeping state of a subnode, select a random period of time during working time period and set the selected period of time as the sleeping time of the subnode.

4. The wireless network apparatus according to claim 3, wherein the processor is configured to:
determine the length of the selected random period of time during the working time period dependent upon remaining energy of each subnode; and/or
determine the length of the selected random period of time during the working time period dependent upon a congestion condition of the network; and/or
determine the length of the selected random period of time during the working time period dependent upon a demand for the precision of the monitor data.

5. The wireless network apparatus according to claim 1, wherein the processor is configured to:
estimate current monitor data reported by a subnode in the sleeping state according to historical monitor data reported by the subnode; or
estimate current monitor data reported by a subnode in the sleeping state according to the monitor data reported by subnodes currently in the working state.

6. The wireless network apparatus according to claim 1, wherein the processor is further configured to, after acquiring the monitor data currently reported by a subnode, revise the estimation value of the monitor data recorded by the interface by using the monitor data currently reported by the subnode.

7. A wireless network system, comprising a plurality of subnodes and the wireless network device according to claim 1.

8. A wireless network system, comprising an aggregation node and a plurality of subnodes,
the subnodes which monitor the condition of a specific object and acquire monitor data comprising:
a first processor configured to randomly set sleeping time and working time of the subnode itself according to a predetermined strategy, and report the monitor data to the aggregation node during the working time; and
the aggregation node comprising:
a second processor configured to:
judge a current state of each subnode;
when a subnode is currently in a working state, directly acquire the monitor data currently reported by the subnode, and send to a memory the acquired monitor data as the monitor data to be recorded corresponding to the subnode; and
when a subnode is currently in a sleeping state, estimate current monitor data of the subnode, and send to the memory an estimation value of the monitor data as the monitor data to be recorded corresponding to the subnode; and
an interface configured to receive the monitor data to be recorded and perform recording.

9. The wireless network system according to claim 8, wherein the first processor is configured to, on a basis of periodic working/sleeping state of the subnode, select a random period of time during working time period and set the selected period of time as the sleeping time.

10. The wireless network system according to claim 9, wherein the first processor is configured to:
determine the length of the selected random period of time during the working time period dependent upon remaining energy of the subnode; and/or
determine the length of the selected random period of time during the working time period dependent upon a congestion condition of the network; and/or
determine the length of the selected random period of time during the working time period dependent upon a demand of the system for the precision of the monitor data.

11. A wireless network node controlling method applied in a wireless network including an aggregation node and a plurality of subnodes, said subnodes monitoring the condition of a specific object and acquiring monitor data, the wireless network controlling method comprising:

randomly setting in advance sleeping time and working time for each subnode according to a predetermined strategy;

judging, by the aggregation node, a current state of each subnode, and recording, by the aggregation node, the monitor data of the subnode according to the current state of the subnode, wherein:

in case that the subnode is currently in a working state, directly acquiring the monitor data currently reported by the subnode, and recording the acquired monitor data;

in case that the subnode is currently in a sleeping state, estimating current monitor data of the subnode, and recording an estimate value of the monitor data.

12. The method according to claim 11, wherein the process of judging a current state of each subnode comprises:

judging whether the subnode is currently in the working state or the sleeping state based on whether the subnode currently reports the monitor data or not.

13. The method according to claim 11, wherein the process of randomly setting sleeping time and working time for each subnode comprises:

independently randomly setting, by each subnode, the sleeping time and the working time in an autonomic way; or randomly setting, by the aggregation node, the sleeping time and the working time for each subnode, and sending, by the aggregation node, the setting result to corresponding subnode.

14. The method according to claim 11, wherein the process of randomly setting sleeping time and working time for each subnode comprises:

on a basis of periodic working/sleeping state of the subnode, selecting a random period of time during the working time period, and setting the selected period of time as the sleeping time.

15. The method according to claim 14, wherein the process of selecting a random period of time during the working time period comprises:

determining the length of the selected random period of time during the working time period dependent upon remaining energy of the respective subnodes; and/or determining the length of the selected random period of time during the working time period dependent upon a congestion condition of the network; and/or determining the length of the selected random period of time during the working time period dependent upon a demand for the precision of monitor data.

16. The method according to claim 11, wherein the process of estimating the current monitor data of the subnode according to a preset algorithm comprises:

estimating current monitor data reported by a subnode in the sleeping state according to historical monitor data reported by the subnode; or estimating current monitor data reported by a subnode in the sleeping state according to the monitor data reported by subnodes currently in the working state.

17. The method according to claim 11, after acquiring the monitor data currently reported by a subnode which is currently in the working state, further comprising:

revising the recorded estimation value of the monitor data of the subnode by using the monitor data currently reported by the subnode.

18. A gateway, comprising the wireless network apparatus according to claim 1.

19. A program product in which machine readable instruction codes are stored, wherein the instruction codes when being read and executed by a machine can perform the method according to claim 11.

20. A storage medium carrying machine readable instruction codes, wherein the instruction codes when being read and executed by a machine can perform the method according to claim 11.

* * * * *